US007095151B2

(12) United States Patent
Fisher et al.

(10) Patent No.: US 7,095,151 B2
(45) Date of Patent: Aug. 22, 2006

(54) SEGMENTED BRUSH TUBE STRUCTURE FOR ACOUSTIC ENERGY DISSIPATION

(75) Inventors: Bryan Todd Fisher, Appin (CA); Stan Simpson, St. Thomas (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/967,499

(22) Filed: Oct. 18, 2004

(65) Prior Publication Data

US 2006/0082245 A1 Apr. 20, 2006

(51) Int. Cl.
*H02K 13/00* (2006.01)

(52) U.S. Cl. ...................... 310/239; 310/242; 310/245; 310/64; 310/52; 310/59

(58) Field of Classification Search ................ 310/239, 310/242, 245, 52, 64
See application file for complete search history.

(56) References Cited

U.S. PATENT DOCUMENTS 3,226,585 A * 12/1965 Roe .......................... 310/239
3,983,432 A * 9/1976 Rankin ....................... 310/242
4,371,803 A * 2/1983 Schindel et al. ............ 310/239
2005/0242683 A1* 11/2005 Lau ........................... 310/239

FOREIGN PATENT DOCUMENTS

FR 774616 * 6/1955
JP 2003153487 A * 5/2003

* cited by examiner

*Primary Examiner*—Darren Schuberg
*Assistant Examiner*—Yahveh Comas

(57) ABSTRACT

A brush tube structure 10 is provided for holding a brush 14 of a motor. The brush tube structure includes a base 15 and a plurality of fingers 12 extending from the base in a cantilevered manner and in direction of travel of the brush. The fingers are constructed and arranged to define a brush receiving space, such that when a brush is in the space, the fingers engage the brush.

16 Claims, 2 Drawing Sheets

SEGMENTED BRUSH TUBE STRUCTURE FOR ACOUSTIC ENERGY DISSIPATION

FIELD OF THE INVENTION

The invention relates to brush tubes for DC electric motors and more particularly to brush tube structures that dissipate acoustic energy.

BACKGROUND OF THE INVENTION

Typical electric motors use brush boxes to contain the brush and restrict its movement. Very tight tolerances on both the brush dimensions and the box dimensions are required to minimize brush displacement. The size of the gap between the brush and the box is directly proportional to the sound quality and sound level of the brush system.

Thus, there is a need to provide a brush tube structure that eliminates the conventional gap between the brush and the box, while permitting the brush to travel and wear over the life of the motor.

SUMMARY OF THE INVENTION

An object of the present invention is to fulfill the need referred to above. In accordance with the principles of the present invention, this objective is obtained by a providing a brush tube structure for holding a brush of a motor. The brush tube structure includes a base and a plurality of fingers extending from the base in a cantilevered manner and in direction of travel of the brush. The fingers are constructed and arranged to define a brush receiving space, such that when a brush is in the space, the fingers engage the brush.

In accordance with another aspect of the invention, a brush is disposed in the brush receiving space so that at least a portion of each finger continuously engages a portion of the brush while permitting the brush to move in the direction of travel.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 1:
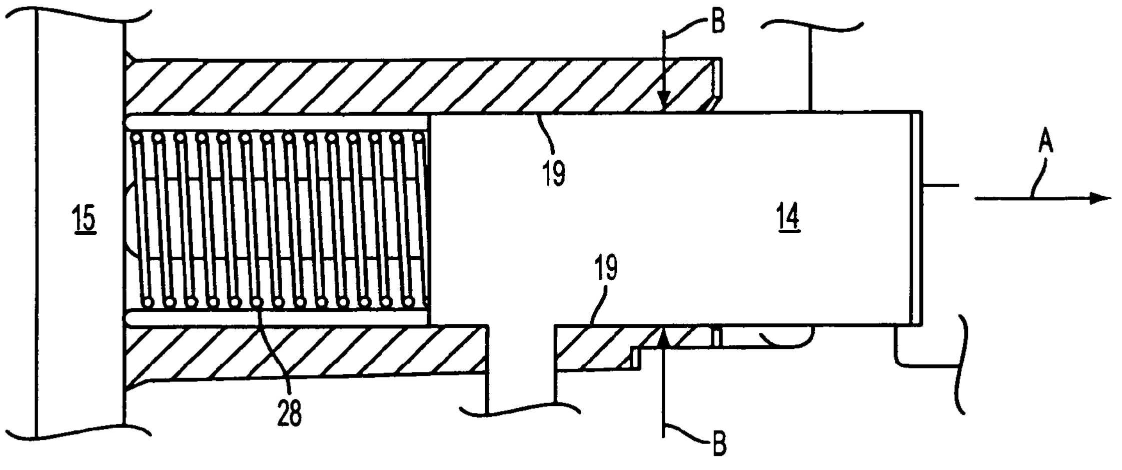
FIG. 1 is an enlarged sectional view of a brush tube structure having cantilever fingers, in accordance with the invention, shown holding a brush.
Figure 2:
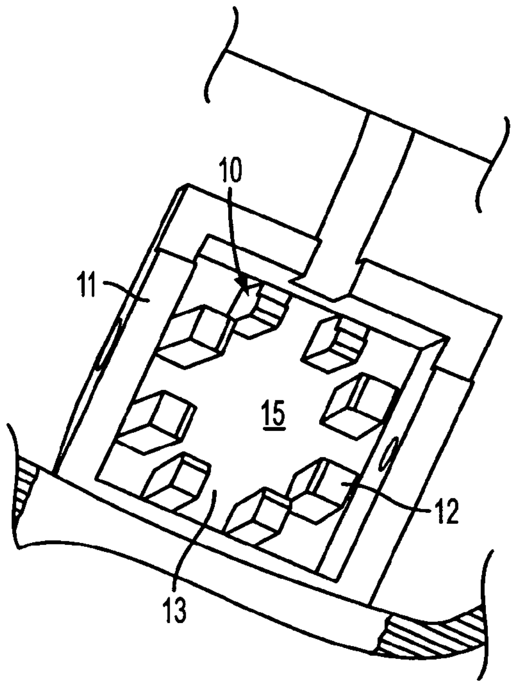
FIGS. 2 and 3 are plan views of the brush tube structure of the invention.
Figure 3:
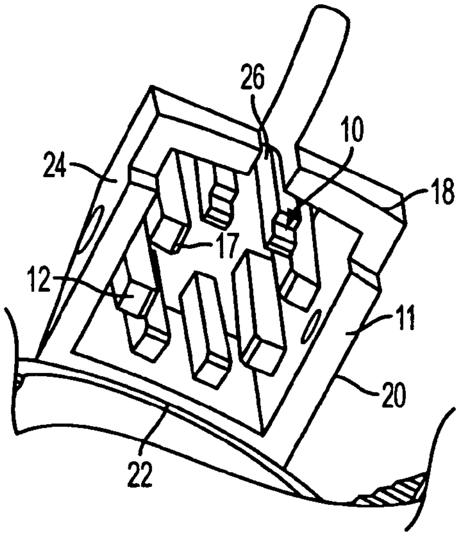
Figure 4:
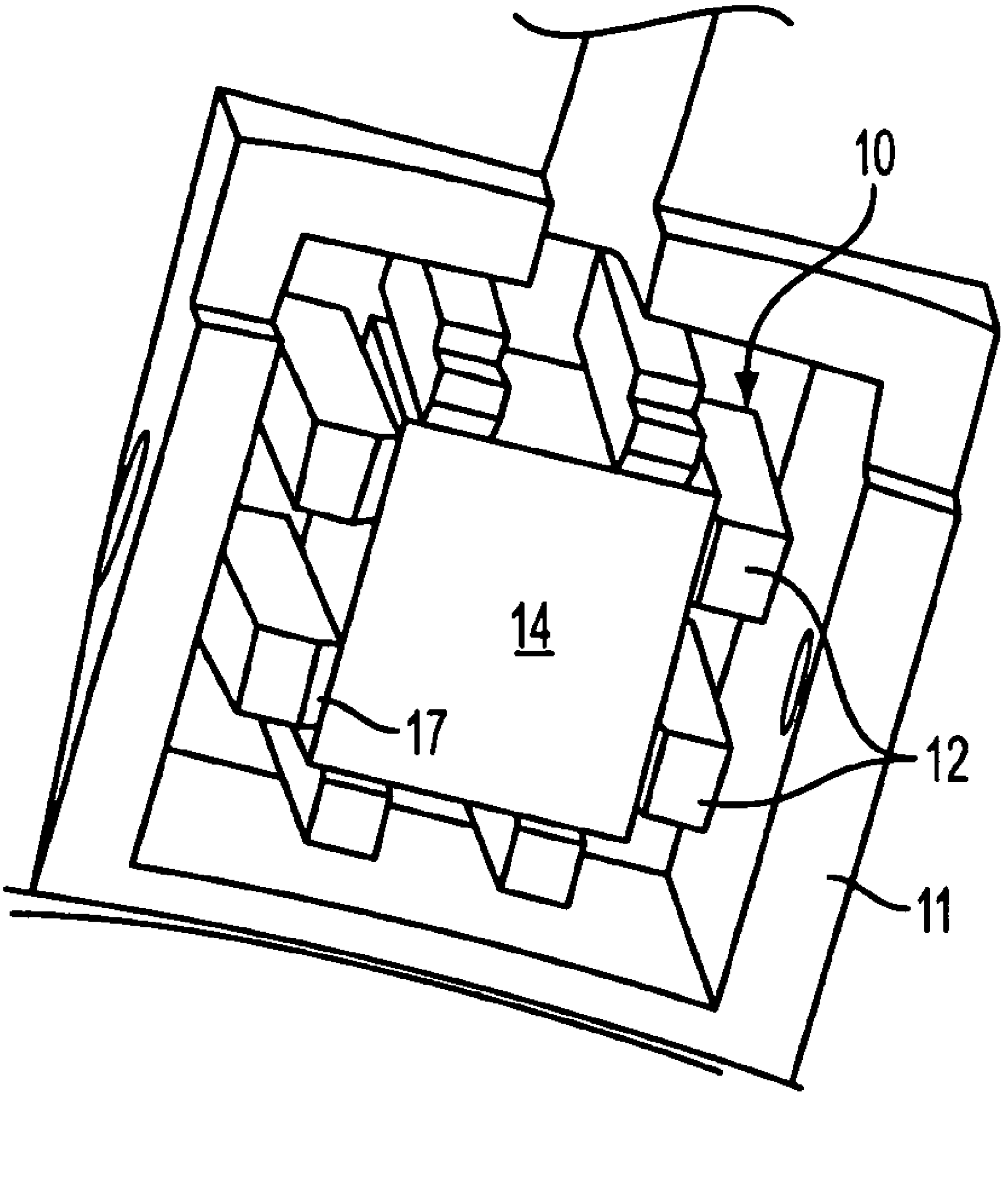
FIG. 4 is a plan view of the brush tube structure of the invention shown holding a brush.

A purpose of this invention is to eliminate a gap between a brush and a brush box, while permitting the brush to travel and wear over the life of the motor in the same fashion as a conventional motor. By elimination of this gap, the brush/box noise is reduced. Thus, with reference to FIGS. 2 and 3, a segmented brush tube structure is shown generally indicated at 10. Instead of a conventional box, a brush box 11 may be provided about the brush tube structure 10. The brush tube structure 10 comprises a plurality of fingers 12 extending in a cantilever manner from a base 15 in a direction of travel A of the brush 14 (FIG. 1). The fingers 12 define a generally box-shaped brush receiving space 13. As shown in FIGS. 1 and 4, when a brush 14 is placed in the space 13, at least a portion of each finger 12 is in interference fit with a portion of the brush 14 to create a zero gap condition between the fingers and the brush. In the embodiment, the brush has fours sides and at least one finger 12 engages each side of the brush. In the embodiment, a planar surface 19 of two fingers 12 engage each side of the brush (FIG. 4). The fingers 12 act as both a locating and a running surface for the brush 14 and maintain continuous contact with the brush 14 through the vibration induced by the commutator bar segments (not shown). Each finger 12 is of generally rectangular cross-section and has a tapered free end 17 for ease of inserting the brush into the space 13. The fingers 12 can be constructed and arranged to provide a spring force B (FIG. 1) on the brush 14 to further hold the brush.

The optional brush box 11 includes four walls 18, 20, 22 and 24 defining a box-shaped structure that surrounds the brush tube structure 10. As shown in FIG. 3, one the walls 18 includes a groove 26 for receiving a shunt for the brush 14. A spring 28 is provided between the base 15 and the brush 14 to bias the brush toward the direction of arrow A in FIG. 1.

The fingers 12 of the brush tube structure 10 dampen vibration and dissipate acoustic energy in several ways:

1) The fingers 12 have lower mass and less contact surface area than a conventional brush tube.

2) The brush tube structure has a long vibration path (down the finger itself) to the base 11 of the brush tube structure, which dampens the acoustic energy before it reaches the structural component of the brush card (or motor assembly in the case of the integral clamshell design). Essentially the brush tube structure is configured as a plurality of cantilevers. The brush 14 displacement is maximum close to the commutator and therefore at the end of the cantilever. At the base of the cantilever the displacement is minimal permit very little energy from being transmitted to the rest of the motor assembly.

3) The spring ability of each finger 12 reduces a cause of the brush tube noise by elimination of the gap.

4) The brush 14 has a better ability to align or float to the location of lowest energy since the brush tube structure location is flexible with the cantilever fingers 12.

This brush tube structure 10 can be integral to the motor case (as in a clamshell motor) or as a separate component and inserted onto a brush card or into a clamshell or other type of motor. The brush tube structure 10 can be made of plastic, steel, brass or any material that can form a cantilever style spring and can be integral to the motor housing as in a clamshell design or as a separate component added to a motor assembly. Furthermore, a visco-elastic material like urethane or flexible polymers could be added to the cantilevers to add damping to the material. This additional damping material would improve the energy dissipating ability of the fingers and could be applied by coating, co-injection molding or two material molding. In certain applications these features can be molded into the clamshell halves that define the motor case.

A segmented brush tube structure 10 lowers the contact area of the brush 14. This also reduces the conductive heat transfer from the brush to the brush tube structure and permits better convection cooling of the brush since cooling air can directly impinge on the brush surface where the fingers are not in contact.

The foregoing preferred embodiments have been shown and described for the purposes of illustrating the structural and functional principles of the present invention, as well as illustrating the methods of employing the preferred embodiments and are subject to change without departing from such principles.

Therefore, this invention includes all modifications encompassed within the spirit of the following claims.

What is claimed is:

1. A brush tube structure for holding a brush of a motor, the brush tube structure comprising:

a base, and a plurality of fingers extending from the base in a cantilevered manner and in direction of travel of the brush, the fingers being constructed and arranged to define a brush receiving space, such that when a brush is in the space, the fingers engage the brush, wherein a box-like structure, formed by walls extending in the direction of travel of the brush, surrounds the brush tube structure, one of said walls including a groove therein constructed and arranged to receive a shunt, said box-like structure having an open end for access to the brush receiving space.

2. The brush tube structure of claim 1, in combination with a brush, the brush being disposed in the brush receiving space so that at least a portion of each finger continuously engages a portion of the brush while permitting the brush to move in the direction of travel.

3. The combination of claim 2, wherein the brush has four sides and at least one finger engages each side of the brush.

4. The combination of claim 3, wherein two fingers engage each side of the brush.

5. The brush tube structure of claim 1, wherein a free end of each finger is tapered.

6. The combination of claim 2, further including a spring between the base and the brush biasing the brush towards the direction of travel.

7. The combination of claim 2, wherein the fingers are constructed and arranged to exert a spring force on the brush.

8. The brush tube structure of claim 1, wherein each finger has a planar surface constructed and arranged to engage a surface of a brush.

9. A brush tube structure for holding a brush of a motor, the brush tube structure comprising:

a base, and means, extending from the base in a cantilevered manner and in direction of travel of the brush, for holding a brush, wherein a box-like structure, formed by walls extending in the direction of travel of the brush, surrounds the brush tube structure, one of said walls including a groove therein constructed and arranged to receive a shunt, said box-like structure having an open end for access to the brush receiving space.

10. The brush tube structure of claim 9, in combination with a brush, the means for holding a brush continuously engaging a portion of the brush while permitting the brush to move in the direction of travel.

11. The combination of claim 10, wherein the brush has four sides and the means for holding a brush includes a plurality of fingers, at least one finger engaging each side of the brush.

12. The combination of claim 11, wherein two fingers engage each side of the brush.

13. The brush tube structure of claim 11, wherein a free end of each finger is tapered.

14. The combination of claim 10, further including a spring between the base and the brush biasing the brush towards the direction of travel.

15. The combination of claim 11, wherein the fingers are constructed and arranged to exert a spring force on the brush.

16. The brush tube structure of claim 9, wherein each finger has a planar surface constructed and arranged to engage a surface of a brush.

* * * * *